United States Patent
Briet et al.

(10) Patent No.: US 9,471,893 B2
(45) Date of Patent: Oct. 18, 2016

(54) METHODS AND APPARATUS TO MONITOR PRODUCTS IN STORES

(75) Inventors: Veronique Briet, Montreal (CA); Erica Bravo Garcia, Distrito Federal (MX); Christian Mendez Gouveia, Buenos Aires (AR)

(73) Assignee: THE NIELSEN COMPANY (US), LLC, New York, NY (US)

(*) Notice: Subject to any disclaimer, the term of this patent is extended or adjusted under 35 U.S.C. 154(b) by 2 days.

(21) Appl. No.: 14/006,659

(22) PCT Filed: Sep. 12, 2012

(86) PCT No.: PCT/US2012/054847
§ 371 (c)(1),
(2), (4) Date: Aug. 5, 2014

(87) PCT Pub. No.: WO2013/040025
PCT Pub. Date: Mar. 21, 2013

(65) Prior Publication Data
US 2014/0379535 A1      Dec. 25, 2014

Related U.S. Application Data

(60) Provisional application No. 61/533,770, filed on Sep. 12, 2011.

(51) Int. Cl.
*G06Q 10/00* (2012.01)
*G06Q 40/00* (2012.01)
(Continued)

(52) U.S. Cl.
CPC ............. *G06Q 10/087* (2013.01); *G06F 19/00* (2013.01); *G06Q 30/02* (2013.01); *G06Q 30/0201* (2013.01); *G06Q 40/12* (2013.12)

(58) Field of Classification Search
CPC ...... G06Q 10/00; G06Q 30/02; G06Q 40/12; G06F 19/00
USPC ................. 705/7.29, 7.32, 30, 321
See application file for complete search history.

(56) References Cited

U.S. PATENT DOCUMENTS

2005/0144189 A1\* 6/2005 Edwards ........... G06F 17/30221
2007/0162361 A1\* 7/2007 Kleemann .............. G06Q 40/12
705/30

(Continued)

FOREIGN PATENT DOCUMENTS

JP    2005196766    7/2005
JP    2007179199    7/2007

(Continued)

OTHER PUBLICATIONS

International Searching Authority, "International Search Report and Written Opinion of the International Searching Authority," issued in connection with international application No. PCT/US2012/054847, mailed on Feb. 28, 2013, 11 pages.

(Continued)

*Primary Examiner* — Olusegun Goyea
(74) *Attorney, Agent, or Firm* — Hanley, Flight & Zimmerman LLC.

(57) ABSTRACT

Methods and apparatus are disclosed to audit products in stores. An example method includes receiving, at a collection entity, a first request from a first entity to audit a first product, the first request including a first instruction to determine information about a second product that competes with the first product, in response to the first request, assigning a first auditor to audit the first product and to record the information about the second product, receiving, at the collection entity, a second request from a second entity to audit a third product, determining that the second request includes a second instruction to determine information about the second product identified in the first request, and in response to the second request, assigning a second auditor to audit the third product without including a further instruction to record the information about the second product.

39 Claims, 8 Drawing Sheets

(51) Int. Cl.
   *G06Q 10/08*   (2012.01)
   *G06Q 30/02*   (2012.01)
   *G06F 19/00*   (2011.01)

(56) References Cited

U.S. PATENT DOCUMENTS

| | | | | |
|---|---|---|---|---|
| 2008/0294476 A1* | 11/2008 | Dupre | ............... | G06Q 30/02 705/7.32 |
| 2009/0030773 A1 | 1/2009 | Kamhoot | | |
| 2011/0276507 A1* | 11/2011 | O'Malley | ............ | G06Q 10/00 705/321 |
| 2014/0278739 A1 | 9/2014 | Sane et al. | | |

FOREIGN PATENT DOCUMENTS

| | | | |
|---|---|---|---|
| JP | 2008077139 | | 4/2008 |
| JP | 2008077139 A | * | 4/2008 |
| WO | 2013040025 | | 3/2013 |

OTHER PUBLICATIONS

United States Patent and Trademark Office, "Non-Final Office Action," issued in connection with U.S. Appl. No. 13/802,105, dated Jan. 28, 2015, 25 pages.

International Bureau, "International Preliminary Report on Patentability," issued in connection with application No. PCT/US2012/054847, mailed on Mar. 20, 2014, 8 pages.

United States Patent and Trademark Office, Final Office Action, issued in connection with U.S. Appl. No. 13/802,105, dated Jul. 17, 2015, 21 pages.

United States Patent and Trademark Office, Advisory Action, issued in connection with U.S. Appl. No. 13/802,105, Nov. 3, 2015, 12 pages.

United States Patent and Trademark Office, Non-Final Office Action, issued in connection with U.S. Appl. No. 13/802,105, Dec. 17, 2015, 23 pages.

United States Patent and Trademark Office, Final Office Action, issued in connection with U.S. Appl. No. 13/802,105, on May 19, 2016, 19 pages.

* cited by examiner

902 ─┐
```
┌─────────────────────────────────┐
│   Shaving cream Brand #1        │
├─────────────────────────────────┤
│            Price                │
│  ☐ No Price Listed              │
│                                 │
│  Regular Price    Sale Price    │
│  [  1.25  ]       [  10.30  ]   │
│                                 │
│         = 83% Diff              │
│  There is more than a 20% difference
│  between previous and current variable. │
└─────────────────────────────────┘
```

FIG. 9

1002 ─┐
```
┌─────────────────────────────────┐
│   Shaving cream Brand X         │
├─────────────────────────────────┤
│          Facings                │
│                                 │
│       Location type             │
│       [ Aisle        ▽ ]        │
│                                 │
│       Shelf number              │
│       [      2       ]          │
│                                 │
│       Facing count              │
│       [     12       ]          │
└─────────────────────────────────┘
```

FIG. 10

1102 ─┐
```
┌─────────────────────────────────┐
│   Shaving cream Brand X         │
├─────────────────────────────────┤
│          Questions              │
│                                 │
│  [ 1. Question number one   ]   │
│                                 │
│  [ 2. Question number two   ]   │
│                                 │
│  [ 3. Question number three ]   │
│                                 │
└─────────────────────────────────┘
```

FIG. 11

1202 ─┐
```
┌─────────────────────────────────┐
│                                 │
│                                 │
│     [      Upload Data      ]   │
│                                 │
│                                 │
└─────────────────────────────────┘
```

FIG. 12

METHODS AND APPARATUS TO MONITOR PRODUCTS IN STORES

RELATED APPLICATIONS

This patent claims the benefit of U.S. Provisional Application No. 61/533,770, filed Sep. 12, 2011, entitled METHODS AND APPARATUS TO MONITOR PRODUCTS IN STORES, which is hereby incorporated by reference in its entirety.

FIELD OF THE DISCLOSURE

This disclosure relates generally to product auditing, and, more particularly, to methods and apparatus to audit products in stores.

BACKGROUND

Product manufacturers, markets, distributors, and others wish to track and research how products are made available and sold in stores. For example, a soft drink manufacturer may want to track the circumstances related to sales of their products and/or other products available on the market at one or more stores in a region. Employees (e.g., auditors) of auditing entities visit stores and collect information about products in stores. The auditors collect information such as the price of a product and the number of units of the product available in a store. The information from the auditors is used to generate reports that are provided to clients of the auditing entities.

BRIEF DESCRIPTION OF THE DRAWINGS

FIGS. 6-12 illustrate example user interfaces of an auditing device used by auditors of the collection entity of FIGS. 1 and/or 2.

DETAILED DESCRIPTION

Figure 1:
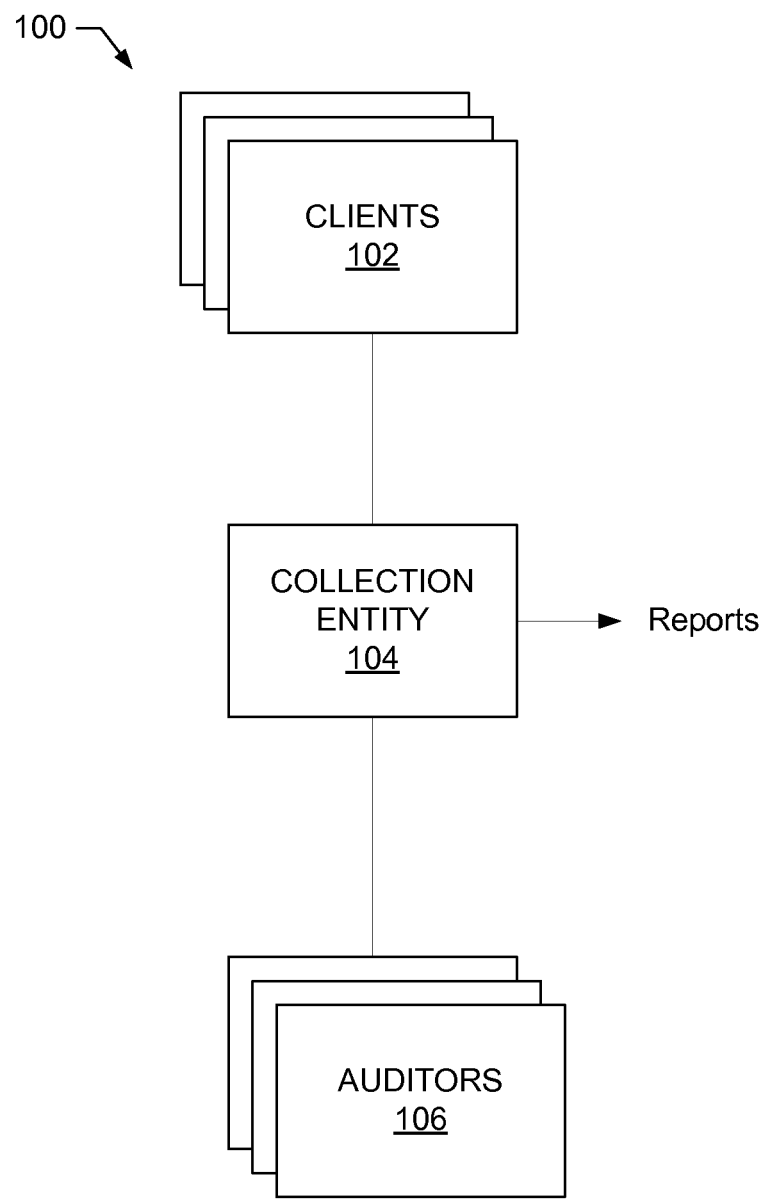
FIG. 1 is a block diagram of an example system for auditing products in stores.

FIG. 1 is a block diagram of an example system 100 for auditing products in stores. As used herein, stores may be any location that carries, sells, stores, distributes, etc. a product that an entity wants to audit. For example, a store may be a grocery store, a department store, a building supply store, a warehouse, a food pantry, a purchasing clubs (e.g., Costco®), etc. The example system 100 of FIG. 1 includes a data collection entity 104 and auditors 106.

Clients 102 of the illustrated example are entities that request auditing of products in stores. The clients 102 may be any type of entity such as product owner(s), store owner(s), marketing entit(ies), conglomerate(s), and so forth. The clients 102 may request any information about any number of products. For example, clients may request information about the location of products in stores, the number of products in stores, the number of products in facings (e.g., the number of products displayed at the front of a shelf) in stores, the price of products in stores, the existence of promotional pricing in stores, the type of exhibition of products (e.g., in a basket, on an end cap, on an island, in an aisle, etc.), etc. The request of the clients 102 may specify a single product, multiple products from a producer/manufacturer, multiple products of a particular type (e.g., products in the soft drink category), etc. The request may also specify a geographical region, particular stores, and/or any other type(s) of information about the areas from which the information should be gathered to satisfy the request. The request may specify any level of granularity such as, for example, information about stockkeeping unit (SKU) numbers, information about products by product regardless of the product size (e.g., grouping 10 ounce, 12 ounce, 16 ounce, and 24 ounce sizes together), information about products by producer/manufacturer (e.g., grouping all products from a particular producer/manufacturer), etc.

According to the illustrated example, requests from the client(s) 102 are gathered by an agent of the collection entity 104 meeting with the client(s) 102 to determine the parameters of the requests. Alternatively, the requests could be generated by the client(s) 102 and provided to the collection entity 104, the requests could be input by the client(s) into an interface of the collection entity 104, etc.

The collection entity 104 of the illustrated example receives one or more request jobs from the client(s) 102 and processes the request job(s) to generate questions that are provided to the auditors 106 for performing an audit to collect facts/data points about products. As used herein, questions may be any type of instruction to collect information including instructions to collect a fact (e.g., Input a price, Input a location, Input a number of products), an instruction to input an opinion (e.g., Identify the product most prominently displayed?), an interrogative sentence (e.g., What is the product nearest the entrance?), etc. The collection entity 104 of the illustrated example reviews the questions and facts to be collected by the auditors and adjusts them to ensure that auditors are not sent to collect the same information multiple times. The facts collected by the auditors are processed by the collection entity 104 to generate reports that are provided to clients and/or any other interested entities. An example collection entity 104 is described in further detail in conjunction with FIGS. 2-5.

The auditors 106 of the illustrated example are agents of the collection entity 104 that visit stores and answer questions to collect the facts requested by the clients 102. The example auditors 106 utilize handheld computing devices to record the facts while visiting the stores and to wirelessly transmit the facts to the collection entity 104. Any type(s) of auditing device(s) may be used by the auditors 106 such as, for example, a laptop computer, a mobile telephone, a printed fact check-list, a notebook, etc. The audit information may be transmitted to the collection entity 104 by wireless electronic transmission, wired electronic transmission, mailing of the audit device and/or tangible storage media (e.g., a storage device or disk) comprising or storing the data, etc. The auditors 106 may be any person that collects the facts such as, for example, employees of the collection entity 104, employees of a store, employees of the clients 102, volunteers, and/or any other person.

The example system 100 of FIG. 1 utilizes a centralized architecture comprising a hub of the collection entity 104 that coordinates branch entities that are spread across a geographic area. For example, in Latin America the hub may be located in Mexico and branch entities may be distributed across the Latin American countries. The auditors 106 are located at the branch entities so that they can visit the stores in the countries. Furthermore, sales agents of the collection entity 104 are located at the branch entities and visit with clients to collect the job requests. The job requests and the data resulting from audits are forwarded to the hub for processing. Accordingly, audit studies across varied geographic markets or other boundaries can be managed and synchronized from a central location. Utilizing a hub facilitates managing audits and reporting in a unified format and avoids redundant facilities, avoids assignment of redundant auditing tasks, and avoids redundant utilization of computing resources (e.g., processing and storage). Alternatively, any system architecture may be utilized. For example, no branch entities may be utilized, multiple hubs may be utilized, etc.

Figure 2:
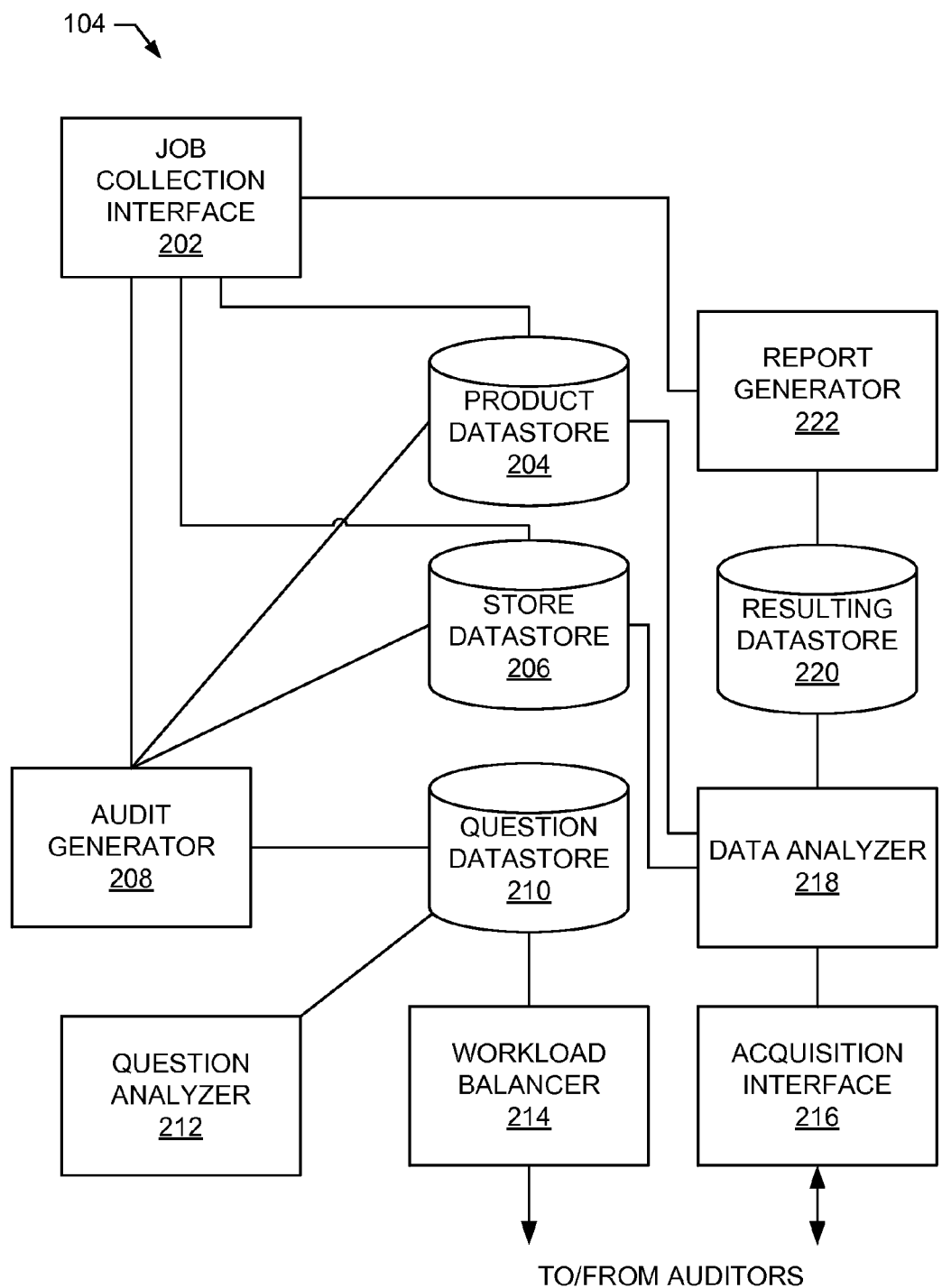
FIG. 2 is a block diagram of an example implementation of the collection entity of FIG. 1.

FIG. 2 is a block diagram of an example implementation of the collection entity 104 of FIG. 1. The example collection entity 104 of FIG. 2 includes a job collection interface 202, a product datastore 204, a store datastore 206, an audit generator 208, a question datastore 210, a question analyzer 212, a workload balancer 214, an acquisition interface 216, a data analyzer 218, a resulting datastore 220, and a report generator 222.

The job collection interface 202 of the illustrated example provides a webpage interface at which agents of the collection entity 104 input job request information that the agents have obtained from the clients 102. The example job request information comprises requirements of information to be provided to the clients 102 in reports. For example, the requirements may identify one or more products to be audited, one or more stores to be audited, one or more facts to be collected, etc. While the job collection interface 202 of the illustrated example receives the job request information from agents via a webpage interface, the job collection interface 202 may receive job request information from any entity (e.g., the job request information may be input by the clients 102) and/or may provide any type of interface for receiving the information (e.g., job request information may be received in postal mail, may be electronically received, may be received over the telephone and input by an operator, etc.).

The job collection interface 202 of the illustrated example also analyzes the job request information to determine if new or updated information about stores and/or products is provided in the received job request information. If the job request information is determined to include new or updated information, the job collection interface 202 stores new or updated product information in the product datastore 204 and/or new or updated store information in the store datastore 206.

After processing received job request information, the job collection interface 202 sends the job request information to the audit generator 208.

The audit generator 208 of the illustrated example receives job request information and generates questions to be answered by the auditors 106. According to the illustrated example, agents of the collection entity 104 review the job request information and generate the questions. For example, if job request information indicates that a client 102 wants to know location and price information for their product and a competitor product, the agent utilizes a software interface of the audit generator 208 to generate instructions for a hand held terminal to display a first user interface instructing an auditor 106 to input the location and price information for the product of the client 102 and a second user interface instructing the auditor 106 to input the location and price information for the competitor product. Example user interfaces provided on the hand held terminal are described in conjunction with FIGS. 6-12. The audit generator 208 may provide any type of user interface for an agent or other entity to specify questions. Alternatively, the audit generator 208 may automatically convert job request information into questions. For example, the audit generator 208 may be provided with a set of rules that instruct how to convert job request information into questions to be answered by the auditors.

The audit generator 208 of the illustrated example utilizes the product datastore 204 and the store datastore 206 when generating the questions. For example, the audit generator 208 may retrieve detailed product information (e.g., manufacturer, SKU, product volume, product dimensions, product weight, product barcode, etc.) from the product datastore 204. The auditor generator 208 may retrieve detailed store information (e.g., store location, store hours, information about audit history, store layout, etc.) from the store datastore 206. The audit generator 208 stores generated questions in the question datastore 210.

The product datastore 204, the store datastore 206, and the question datastore 210 of the illustrated example are databases. Alternatively, the datastores 204, 206, 210 may be any type of storage device or storage disk such as, for example, one or more of a file, a random access memory, a hard drive, a flash memory, a DVD, a CD, etc.

The question analyzer 212 of the illustrated example analyzes questions stored in the question datastore 210 to eliminate question redundancy across auditing studies. For example, a first client 102 may request information about their product and about a product from Brand X. A second client 102 may request information about their product and the product from Brand X. The question analyzer 212 analyzes the questions to determine that questions for gathering information about the product from Brand X are stored twice in the question datastore 210. After determining that matching questions are stored in the question datastore 210, the question analyzer 212 removes one set of questions to eliminate the redundancy and associates the remaining set of questions with both auditing jobs so that the product information can be collected once and distributed to all requesting clients 102. The operation of the question analyzer 212 is described in further detail in conjunction with FIG. 3.

The workload balancer 214 of the illustrated example retrieves questions from the question datastore 210 and transmits them to the auditors 106. The workload balancer 214 attempts to balance the workload provided to each of the auditors 106 by balancing the number of facts to be collected by the questions assigned to each of the auditors 106. For example, the workload balancer 214 may be set to assign the collection of 1000 facts to each auditor 106. Thus, when the workload balancer 214 determines that there are questions to be assigned to an auditor 106 (e.g., questions to be answered at a store that is in the geographic area in which an auditor 106 operates), the workload balancer 214 adds a number of facts/data points to be collected by the questions to be assigned to the number of facts/data points already assigned to the auditor 106. If the sum does not exceed a threshold (e.g., 1000 facts), the questions are assigned to the auditor 106. If the sum exceeds the threshold, the questions are assigned to another auditor 106. Alternatively, any other algorithm for assigning questions to auditors may be utilized such as, for example, assigning questions based on the number of stores assigned to an auditor, assigning questions based on completion date required by the clients 102, assigning questions based on the distance to travel between stores, etc.

The acquisition interface 216 of the illustrated example receives the data collected by the auditors 106. The acquisition interface 216 may be a wireless communication interface, a wired communication interface, a postal mailbox processed by an agent of the collection entity 104, a telephone managed by an agent of the collection entity 104, etc. The acquisition interface 216 transmits the received information to the data analyzer 218.

The example data analyzer 218 of FIG. 2 analyzes the information received from the auditors 106 for quality assurance. The quality assurance review analyzes the information for errors. For example, the quality assurance review may compare product prices to prices from previous audits to identify prices that have varied by a percentage that exceeds a threshold, may identify questions that have not been answered, etc. Information determined to be in error is flagged for review by an agent of the collection entity 104 and, if needed, collected again during a new audit.

The data analyzer 218 of the illustrated example also reviews the information receive from the auditors 106 for new and/or updated information about stores and/or products. For example, the data analyzer 218 may compare the received information to information stored in the product datastore 204 and/or the store datastore 206. If new or updated product information is identified, the data analyzer 218 updates the product datastore 204. If new or updated store information is identified, the data analyzer 218 updates the store datastore 206.

After analyzing the information received from the auditors 106, the data analyzer 220 of the illustrated example stores the received information in the resulting datastore 220.

The resulting datastore 220 of the illustrated example is a database (e.g., an SQL database). Alternatively, the resulting datastore 220 may be any type(s) of storage device and/or storage disk such as, for example, one or more of a file, a random access memory, a hard drive, a flash memory, a DVD, a CD, etc.

The example report generator 222 of FIG. 2 retrieves the information received from auditors from the resulting datastore 220 to generate reports. The reports may be provided as printed reports, reports provided on a webpage, reports provided on a spreadsheet, reports provided in a database, etc. To generate the reports, the report generator 222 of the illustrated example accesses the job collection interface 202 to determine the information requested by the clients 102 in the jobs requests. The report generator 222 processes the information retrieved from resulting datastore 220 to satisfy the job requests. For example, if a first client 102 requested information about products from brand X at the brand level (e.g., a count of the number of products of the brand in a store) and a second client 102 requested information about the products from brand X at the SKU level (e.g., a count of the number of products of the brand broken down by each SKU), the question analyzer 212 of the illustrated example converts the request to have a single auditor collect the information at the SKU level. To satisfy the job request of the example first client 102, the report generator 222 sums the information collected at the SKU level for the brand to determine information at the brand level and generates a report including the summed information. The report generator 222 may perform any procedure to process the information received from the auditors 106 to satisfy the job requests of the client 102. For example, the report generator 222 may sum product information at different levels of product granularity, may sum information for different time periods (e.g., sum weekly information to get monthly information), may sum information at different levels of product location requests, may generalize any information, may filter information (e.g., filter out information requests by a first client 102 but not requested by a second client 102), etc. While the example report generator 220 of the illustrated example receives information from the resulting datastore 220 and the job collection interface 202, the report generator 222 may additionally or alternatively access any data source(s) including the product datastore 204, the store datastore 206, the question datastore 210, the audit generator 208, and the question analyzer 212.

While an example manner of implementing the collection entity 104 is illustrated in FIG. 2, one or more of the elements, processes and/or devices illustrated in FIGS. 1-2 may be combined, divided, re-arranged, omitted, eliminated and/or implemented in any other way. Further, the job collection interface 202, the product datastore 204, the store datastore 206, the audit generator 208, the question datastore 210, the workload balancer 214, the acquisition interface 216, the data analyzer 218, the resulting datastore 220, the report generator 222, and/or more generally the collection entity 104 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the apparatus or system claims of this patent are read to cover a purely software and/or firmware implementation, at least one of the job collection interface 202, the product datastore 204, the store datastore 206, the audit generator 208, the question datastore 210, the workload balancer 214, the acquisition interface 216, the data analyzer 218, the resulting datastore 220, the report generator 222, and/or more generally the collection entity 104 are hereby expressly defined to include a tangible computer readable medium such as a memory, DVD, CD, Blu-ray, etc. storing the software and/or firmware. Further still, the job collection interface 202, the product datastore 204, the store datastore 206, the audit generator 208, the question datastore 210, the workload balancer 214, the acquisition interface 216, the data analyzer 218, the resulting datastore 220, the report generator 222, and/or more generally the collection entity 104 may include one or more elements, processes and/or devices in addition to, or instead of, those illustrated in FIGS. 1-2, and/or may include more than one of any or all of the illustrated elements, processes and devices.

Figure 3:
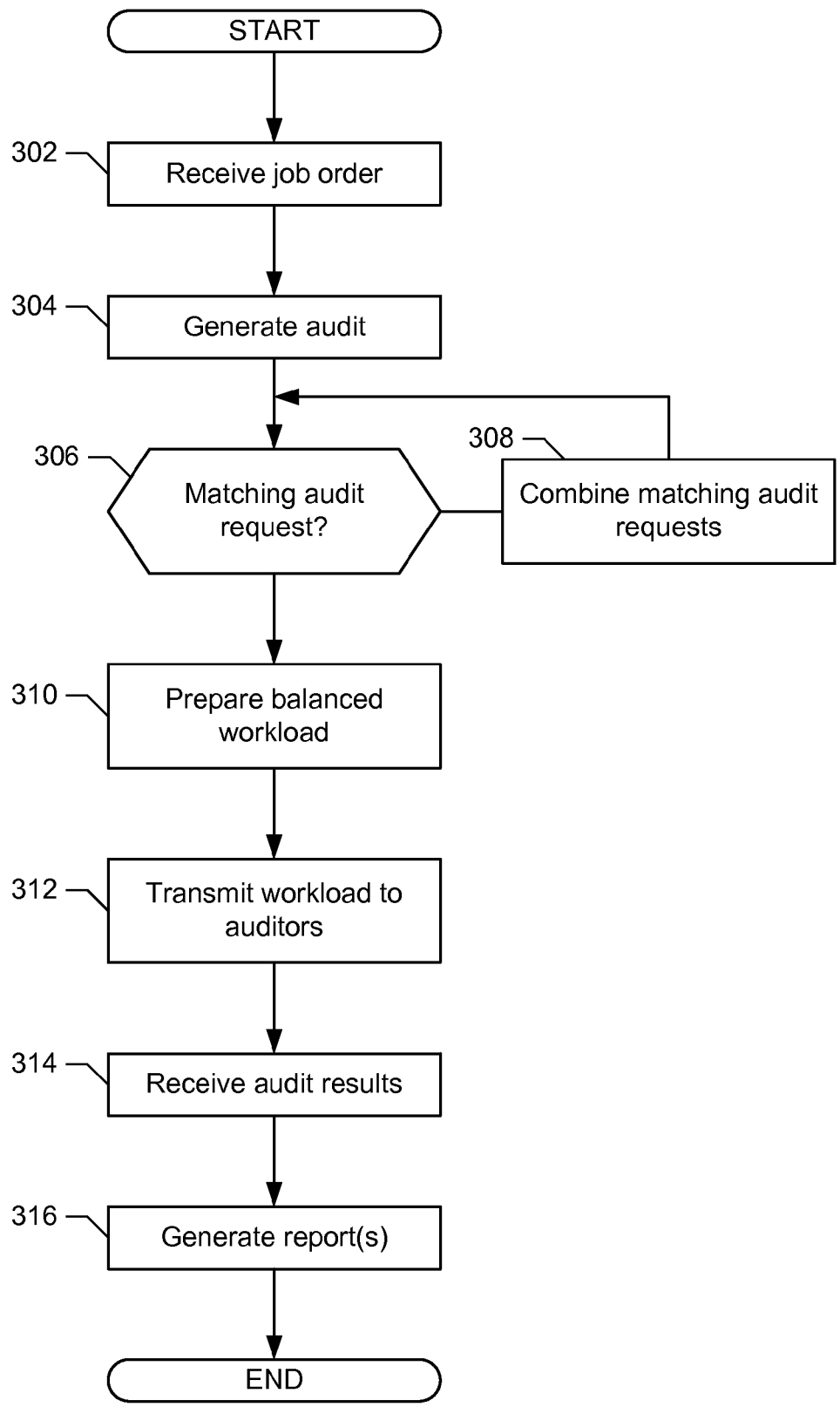
FIGS. 3-5 are flowcharts representative of example machine readable instructions that may be executed to implement the collection entity of FIGS. 1 and/or 2.
Figure 4:
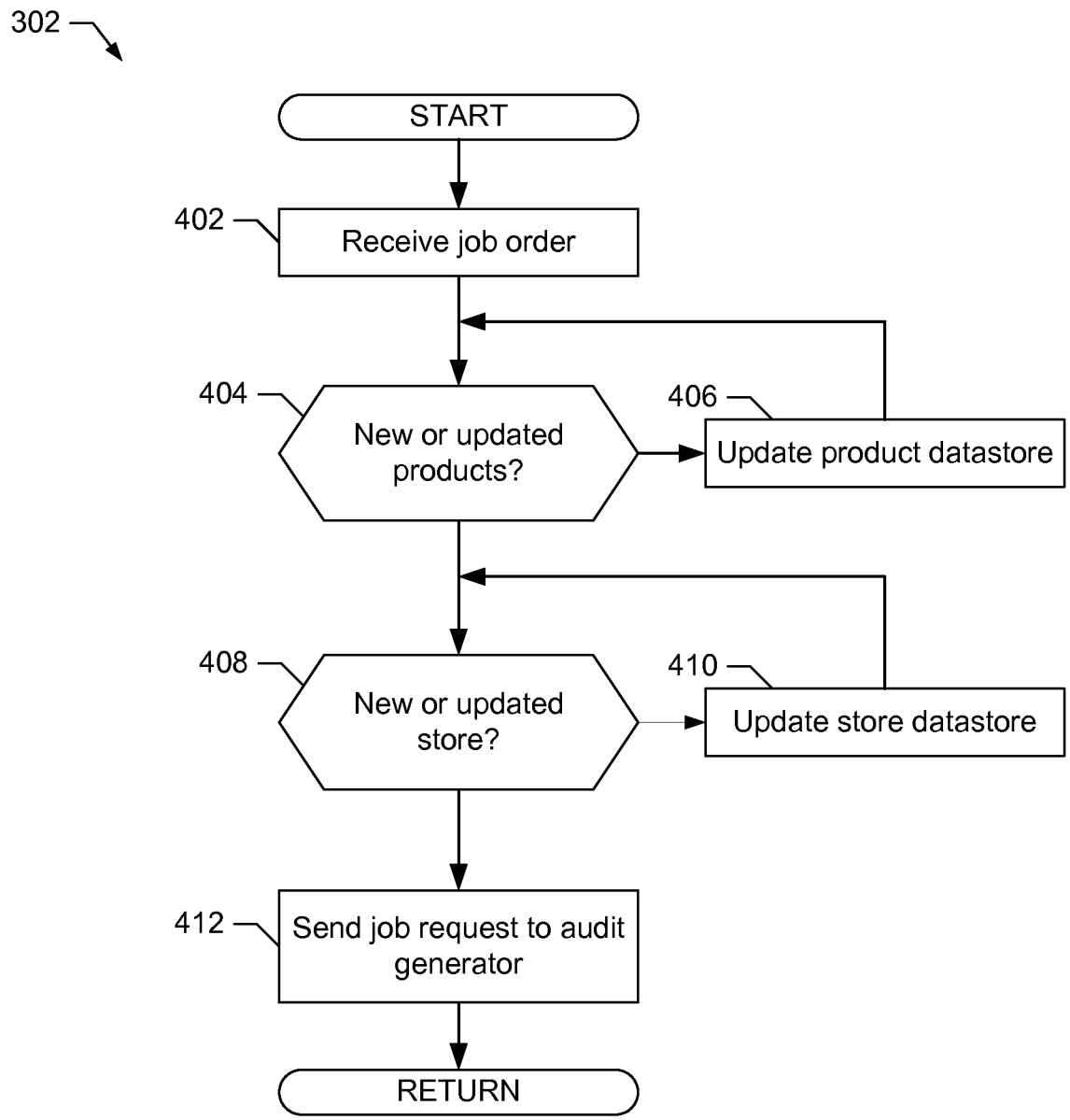
Figure 5:
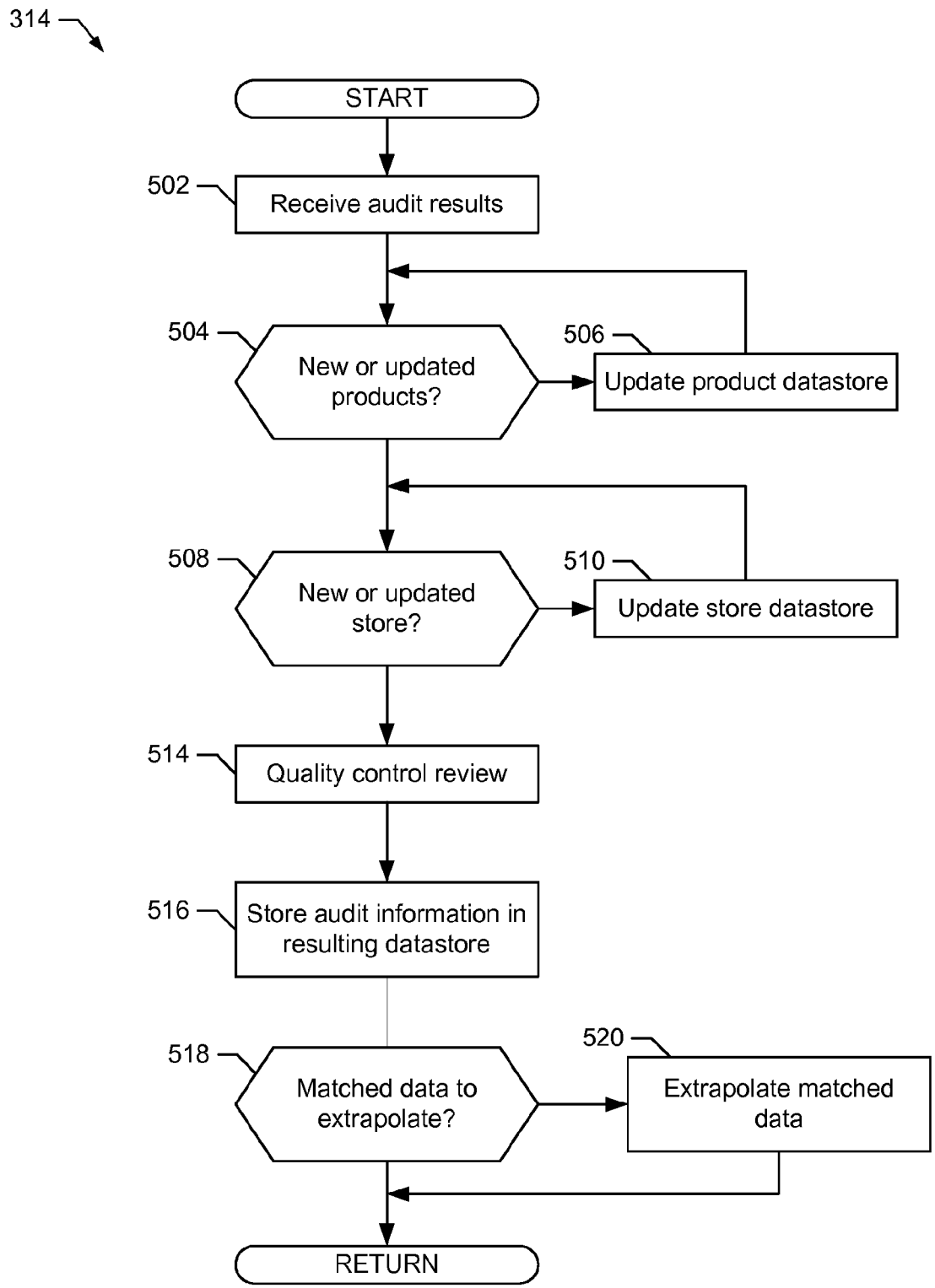

Flowcharts representative of example machine readable instructions which may be executed to implement, the job collection interface 202, the product datastore 204, the store datastore 206, the audit generator 208, the question datastore 210, the workload balancer 214, the acquisition interface 216, the data analyzer 218, the resulting datastore 220, the report generator 222, and more generally the collection entity 104 are shown in FIGS. 3-5. In these examples, the machine readable instructions comprise a program for execution by a processor such as the processor 1312 shown in the example processor platform 1300 discussed below in connection with FIG. 13. The program may be embodied in software stored on a tangible computer readable storage medium such as a CD-ROM, a floppy disk, a hard drive, a digital versatile disk (DVD), a Blu-ray disk, or a memory associated with the processor 1312, but the entire program and/or parts thereof could alternatively be executed by a device other than the processor 1312 and/or embodied in firmware or dedicated hardware. Further, although the example programs are described with reference to the flowcharts illustrated in FIGS. 3-5, many other methods of implementing, the job collection interface 202, the product datastore 204, the store datastore 206, the audit generator 208, the question datastore 210, the workload balancer 214, the acquisition interface 216, the data analyzer 218, the resulting datastore 220, the report generator 222, and/or more generally the collection entity 104 may alternatively be used. For example, the order of execution of the blocks may be changed, and/or some of the blocks described may be changed, eliminated, or combined.

As mentioned above, the example processes of FIGS. 3-5 may be implemented using coded instructions (e.g., computer readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device and/or storage disk in which information is stored for any duration (e.g., for extended time periods, permanently, brief instances, for temporarily buffering, and/or for caching of the information). As used herein, the term tangible computer readable storage medium is expressly defined to include any type of computer readable storage medium and/or storage disk and to exclude propagating signals. Additionally or alternatively, the example processes of FIGS. 3-5 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage medium and/or storage disk in which information is stored for any duration (e.g., for extended time periods, permanently, brief instances, for temporarily buffering, and/or for caching of the information). As used herein, the term non-transitory computer readable medium is expressly defined to include any type of computer readable device and/or storage disk and to exclude propagating signals. As used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

Example machine readable instructions that may be executed to implement the collection entity 104 of FIGS. 1 and/or 2 are illustrated in FIG. 3. With reference by example to FIGS. 1 and 2, the example machine readable instructions of FIG. 3 begin when the job interface 202 receives a job order of the clients 102 (block 302). The job order may be received from a webpage interface, an agent of the collection entity 104 inputting the information, and/or by any other method. Next, the audit generator 208 generates audit questions to be answered by the auditors 106 and stores the audit questions in the question datastore 210 (block 304). The audit generator 208 generates the questions to cause the auditors 106 to collect the facts needed to generate a report to satisfy the job requests from the client 102.

The question analyzer 212 then analyzes the questions stored in the question datastore 210 to determine if any matching audit requests are found (block 306). The question analyzer 212 may perform the analysis at any time such as, for example, after a threshold number of questions are generated, upon a trigger from an agent, at a set periodic time, at a threshold amount of time before a report is due to be provided to a client, etc.

Audit questions are determined to match if they request the same information. For example, audit questions may request identical information (e.g., two questions requesting a price of a product carrying a particular SKU). Audit questions may also be determined to be matching when one question or set of questions can be answered by processing question(s) of another question or set of questions. For example, audit questions may be determined to match if a first set of questions requests information at a high level (e.g., less granular) and a second set of questions requests information at a low level (e.g., more granular), the information for the first set of questions can be computed from the second set of questions (e.g., by adding, summing, combining, grouping, etc. the information from the second set of questions).

When matching audit requests are found (block 306), the question analyzer 212 combines the matching audit requests (block 308). For example, when two questions or sets of questions are identical matches, one of the two questions or sets of questions is removed from the question datastore 210. When one question or set of questions can be determined from another question or set of questions, the more granular, low level, detailed, etc. question or set of questions is kept in the question datastore 210 and the less granular, high level, less detailed, etc. question or set of questions is removed from the question datastore 210. When questions are removed from the question datastore 210, the remaining question or set of questions is associated with both audit requests so that the results of the single collection by an auditor 106 can be reported to both requesting clients 102 (e.g., auditors may simultaneously two different projects). By combining matching audit requests, the storage space needed to store the audit questions in the question datastore 210 is reduced. The number of questions to be assigned to auditors is also reduced. These reductions reduce the computing resources needed to assign the questions and process the questions at the auditors and reduce the human resources needed to answer the questions. The amount of information collected is also reduced (i.e., because duplicate information is not collected) thereby reducing the computing resources needed to store and process the results of the auditing. After combining matching audit requests, control returns to block 306 to determine if any further matching audit requests exist.

When no matching audit requests are detected at block 306, the workload balancer 214 prepares a balanced workload for the auditors 106 (block 310). For example, the workload balancer 214 prepares a balanced workload that assigns questions to auditors without assigning matching questions twice (e.g., a first question that can be answered by answering a second question is not separately assigned to an auditor) because the question analyzer 212 has removed one or more of the matching questions. Likewise, the workload balancer 214 may assign a first auditor to perform a first audit from a first client that requests auditing of information about a first product and a second product and may assign a second auditor to perform a second audit from a second client that requests auditing of information about the second product and the third product, but will not include an instruction for the second auditor to audit the second product that is already being audited by the first auditor.

In some example workload balancing methods, questions are assigned to auditors 106 based on a threshold number of facts to be collected (e.g., auditors 106 are not assigned more than 1000 facts). The number of facts to be collected assigned to auditors 106 may be uniform across auditors 106 in a particular geographic area or the number of facts to be collected may be varied. For example, the historical workload of an auditor 106 may be tracked to determine an average number of facts that the auditor 106 is capable of collecting in a given period (e.g., a month) and the workload balancer 214 may assign the questions to the analyzer based on the average of each auditor 106.

The workload balancer 214 of the illustrated example then transmits the workload to the auditors 106 (block 312). For example, the workloads may be transmitted to the auditors 106 when a threshold amount of questions is prepared, when the time frame of the audit requested by the clients 102 dictates that the audit is performed, at a set time (e.g., beginning of the month), and/or at any other time or combination of the foregoing.

After the auditors 106 have collected the information assigned to them, the acquisition interface 216 receives the information from the auditors 106 (block 314). The report generator 222 then generates reports that are transmitted to the clients or other interested entities (block 316).

Example machine readable instructions that may be executed to implement block 302 of FIG. 3 to receive job orders are illustrated in FIG. 4. The example machine readable instructions of FIG. 4 begin when the job interface 202 receives a job order of the clients 102 (block 402). The job interface 202 then determines if there are new or updated products included in the job request (block 404). The products may be identified as new or updated in the job request and/or the job interface 202 may compare products identified in the job request to products stored in the product datastore 204. When new or updated products are identified, the product datastore 204 is updated with the new or updated product information (block 406). Control then returns to block 404 to determine if any further new or updated products are included in the job request.

When new or updated product information is not identified (block 404), the job interface 202 determines if there are new or updated stores included in the job request (block 408). The stores may be identified as new or updated in the job request and/or the job interface 202 may compare stores identified in the job request to stores stored in the store datastore 206. When new or updated stores are identified, the stores datastore 206 is updated with the new or updated product information (block 410). Control then returns to block 408 to determine if any further new or updated stores are included in the job request.

When new or updated store information is not identified (block 408), the job interface 202 sends the job request to the audit generator 208 (block 412).

Example machine readable instructions that may be executed to implement block 314 of FIG. 3 to receive audit results are illustrated in FIG. 5. The example machine readable instructions of FIG. 5 begin when the acquisition interface 216 receives audit information from auditors 106 (block 502). The example machine readable instructions of FIG. 5 begin when the job interface 202 receives a job order of the clients 102 (block 402). The data analyzer 218 then determines if there are new or updated products included in the audit information (block 504). The products may be identified as new or updated in the audit information and/or the data analyzer 218 may compare products identified in the job request to products stored in the product datastore 204. When new or updated products are identified, the product datastore 204 is updated with the new or updated product information (block 506). Control then returns to block 504 to determine if any further new or updated products are included in the audit information.

When new or updated product information is not identified (block 504), the data analyzer 218 determines if there are new or updated stores included in the audit interface (block 508). The stores may be identified as new or updated in the audit information and/or the data analyzer 218 may compare stores identified in the audit information to stores stored in the store datastore 206. When new or updated stores are identified, the stores datastore 206 is updated with the new or updated product information (block 510). Control then returns to block 508 to determine if any further new or updated stores are included in the audit information.

When new or updated store information is not identified (block 508), the data analyzer 218 performs a quality review of the audit information to determine if any errors or discrepancies are present in the audit information (block 514). The data analyzer 218 then stores the audit information in the resulting datastore 220 (block 516).

The report generator 222 then retrieves data from the resulting datastore 220 and determines if there is matched data to be extrapolated (block 518). In other words, the report generator 222 determines if processing was performed by the question analyzer 212 that needs to be reversed to determine the information requested by one of the clients 102. When the report generator 222 determines that there is matched data to be extrapolated, the report generator 222 extrapolates the matched data (block 520).

For example, if a client 102 has requested information about a brand's products at the brand level but the question analyzer 212 has caused the data to be collected at the product level, the report generator 222 extrapolates the information at the brand level by summing the data at the brand level. In another example, information for a month may be extrapolated by summing data collected weekly during the month. In another example, information for a chain of stores may be extrapolated by summing information collected for individual stores of the chain.

After extrapolating matched data (block 520) or determining that no matched data is to be extrapolated (block 518), control returns to block 316 of FIG. 3 to generate reports based on the audit information.

FIGS. 6-12 illustrate example user interfaces of an auditing device (e.g., a hand held terminal) used by auditors of the collection entity 104 of FIGS. 1 and 2. The auditing device may, for example, be implemented by the processor system 1300 of FIG. 13.

Figure 6:
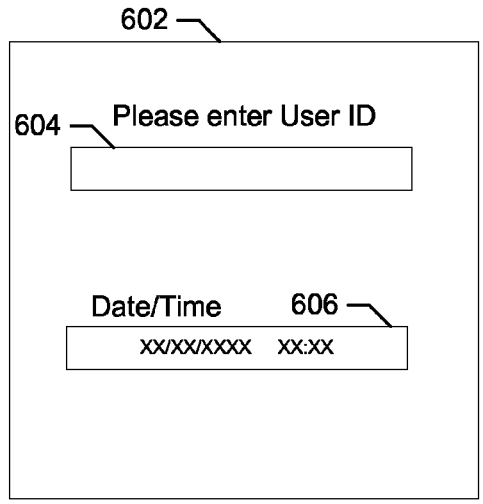

The example user interface 602 of FIG. 6 provides a logon interface that includes an input box 604 for an auditor 106 to input their user identifier and an input box 606 to confirm or modify the date and time of the audit. The user interface 602 may include additional inputs for an auditor 106 to complete before beginning an audit such as, for example, a password, a geographic location, contact information, etc.

Figure 7:
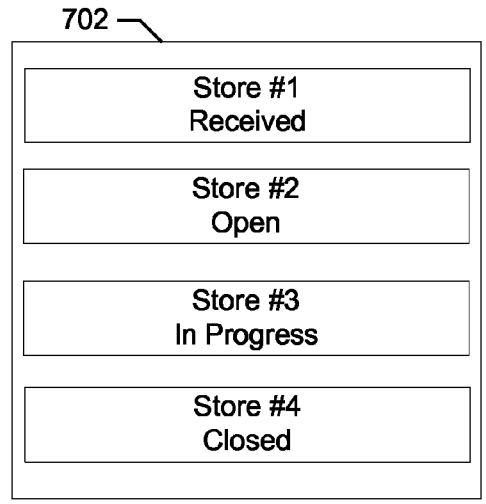

After an auditor 106 has submitted logon information using user interface 602, a store user interface 702 of FIG. 7 is displayed. The store user interface 702 includes selection boxes identifying stores to be audited by the auditor 106. The example selection boxes include the name of the store and a store audit status. Stores that have been received for auditing are identified as "Received," stores at which auditing has been previously started are identified as "Open," stores that are currently selected for auditing (e.g., a store at which the auditor 106 is currently visiting) are identified as "In Progress," and stores at which the auditing has been completed are identified as "Closed." Using the user interface 702 an auditor 106 can select a store for which auditing information will be submitted. For example, before entering a store, the auditor 106 selects the store at which the auditor 106 is located so that the auditing device will know the store to which the subsequent auditing information is to be assigned. The list of stores on the store user interface 702 may be determined based on the geographical location of the auditor 106 (e.g., using a global positioning system in the auditing device).

Figure 8:
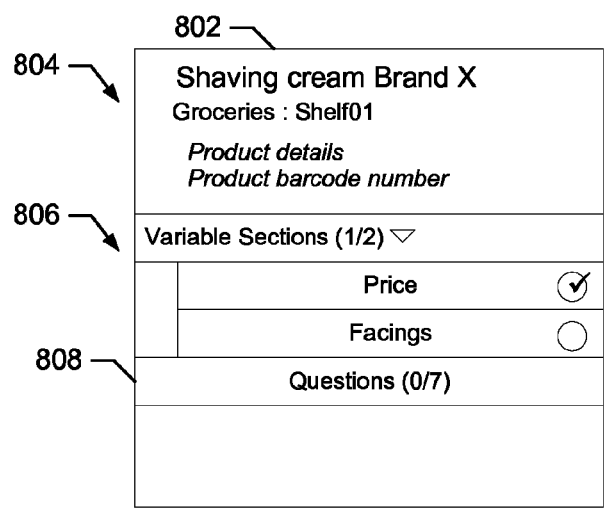

The example user interface 802 of FIG. 8 provides a product information submission interface. The user interface 802 may be displayed after a particular product is selected from a list of products to be audited, a barcode is scanned or input, etc. The product information submission interface 802 includes a listing of product details 804, a menu of sections 806 of fact questions that can be selected for input, and a selection box 808 for requesting display of a question user interface for answering various questions as part of the audit.

The listing of product details 804 of the illustrated example includes a product name (Shaving cream), a brand name (Brand X), a location type (Groceries), exhibition information (Shelf01), product details (e.g., product size, dimensions, weight, etc.), and a product barcode. Any other product information or details may additionally or alternatively be displayed. The listing of product details 804 may be selected by an auditor 106 for editing (e.g., if the product dimensions have changed, the auditor 106 may touch the area in which the product details are displayed and may be provided with a user interface for submitting updated product details).

The menu of sections 806 lists various fact sections that may be selected for input. The illustrated example, shows a Price section, which is checked as having been completed, and a Facings section which is marked as incomplete. Any sections relevant to information requested by the clients 102 may be provided including: Price, Facings, Stock, Comments, etc. When a fact section is selected (e.g., by touching an area associated with display of the fact section), a user interface is displayed for entering information associated with the fact section as shown, by example, in FIGS. 9 and 10.

FIGS. 9 and 10 illustrate example user interfaces 902 and 1002 at which an auditor 106 inputs requested auditing variable information. The example user interface 902 provides a vehicle for inputting price information. According to the illustrated example, the user interface 902 provides an indication of the percentage difference between an input regular price and an input sale price. When the percentage difference exceeds a threshold (e.g., 20%), the user interface 902 displays a warning so that the auditor 106 can double check that they have not made a typographical error in entering the pricing information. The user interface 1002 provides a user interface for inputting product facing and location information. The user interface 1002 includes a selection list for inputting a location or exhibition type (e.g., in an aisle, in a store entrance, on an end-cap, in an island, at the checkout register, etc.). Based on the selection of the location type, additional information can be input about the location (e.g., if an aisle is selected, a shelf on which the product is located can be selected). The user interface 1002 also includes an input box for the auditor 106 to enter the facing count (i.e., the count of the products shown at the front of the shelf).

FIG. 11 illustrates an example user interface 1102 for an auditor 106 to answer questions associated with a product. The auditor 106 may select a question by touching an area associated with a display question. The questions may be answered by inputting text, selecting a checkbox or radio button (e.g., for yes/no, true/false, or multiple choice questions, etc.), taking a picture, or by any other input.

FIG. 12 illustrates an example user interface 1202 that includes a selection box for a user to upload the collected data to the collection entity 104.

The user interfaces of FIGS. 6-12 are provided as examples and additional or alternative user interfaces may be utilized. For example, user interfaces may be provided to add new products; add details to new or existing products, indicate a reused product; delete products, input comments for stores, locations, exhibitions, categories, manufacturers, brands, products, questions, etc.; configure custom look and feel of other user interfaces; managing enabling and disabling of validation rules; move from one user interface to another using links, menus, etc.; sort lists of products, stores, questions, etc.; filter lists of products, stores, questions, etc.; view and/or edit status flags; etc.

Figure 13:
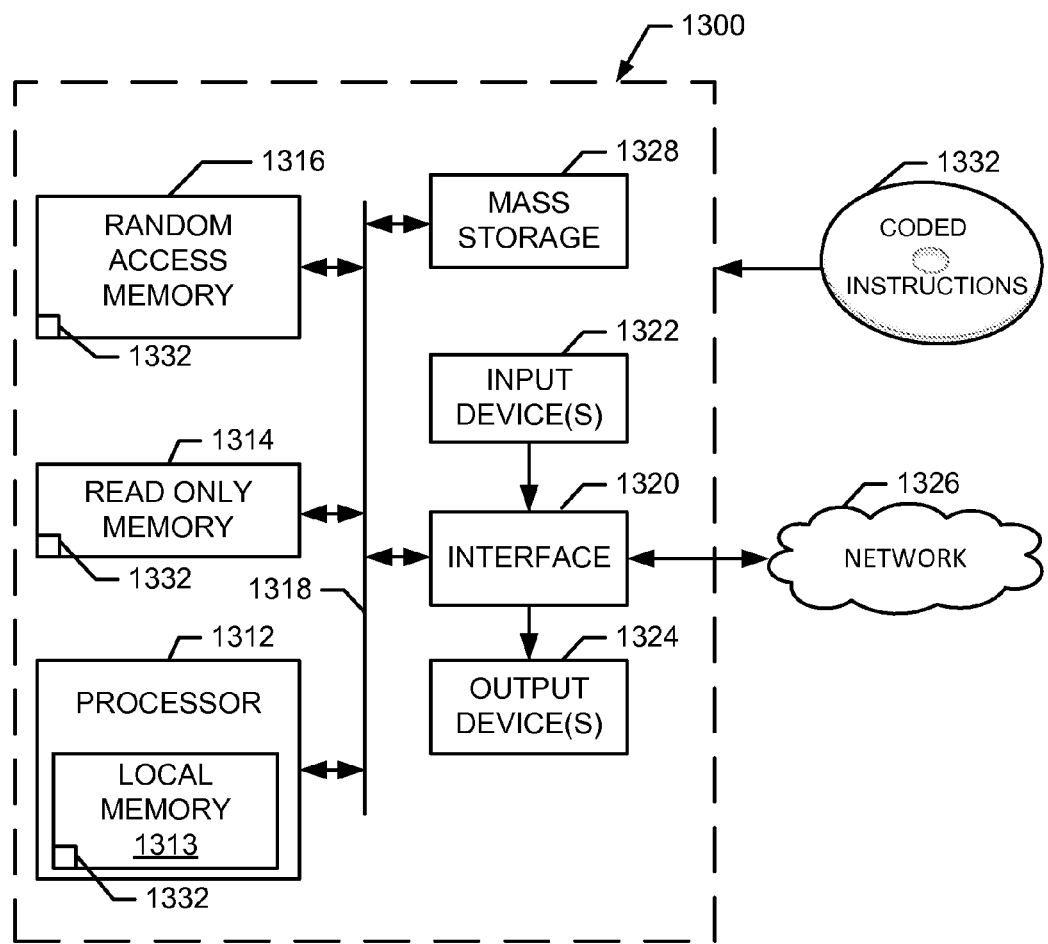
FIG. 13 is a block diagram of an example processing system that may execute the example machine readable instructions of FIGS. 3-5, to implement the example collection entity of FIGS. 1 and/or 2.

FIG. 13 is a block diagram of an example processor platform 1300 capable of executing the instructions of FIGS. 3-5 to implement the components of the system 100 of FIGS. 1 and 2. The processor platform 1300 may additionally or alternatively implement the auditing device utilized by the auditors 106 of FIG. 1. For example, the processor platform 1300 may displayer the user interfaces illustrated in FIGS. 6-12. The processor platform 1300 can be, for example, a server, a personal computer, a mobile phone (e.g., a cell phone), a personal digital assistant (PDA), an Internet appliance, a tablet computer, an embedded computing device, or any other type of computing device.

The system 1300 of the instant example includes a processor 1312. For example, the processor 1312 can be implemented by one or more microprocessors or controllers from any desired family or manufacturer.

The processor 1312 includes a local memory 1313 (e.g., a cache) and is in communication with a main memory including a volatile memory 1316 and a non-volatile memory 1314 via a bus 1318. The volatile memory 1316 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1314 may be implemented by flash memory and/or any other desired type of memory device. Access to the main memory 1314, 1316 is controlled by a memory controller.

The processor platform 1300 also includes an interface circuit 1320. The interface circuit 1320 may be implemented by any type of interface standard, such as an Ethernet interface, a universal serial bus (USB), and/or a PCI express interface.

One or more input devices 1322 are connected to the interface circuit 1320. The input device(s) 1322 permit a user to enter data and commands into the processor 1312. The input device(s) can be implemented by, for example, a keyboard, a mouse, a touchscreen, a track-pad, a trackball, isopoint and/or a voice recognition system.

One or more output devices 1324 are also connected to the interface circuit 1320. The output devices 1324 can be implemented, for example, by display devices (e.g., a liquid crystal display, a cathode ray tube display (CRT), a printer and/or speakers). The interface circuit 1320, thus, typically includes a graphics driver card.

The interface circuit 1320 also includes a communication device such as a modem or network interface card to facilitate exchange of data with external computers via a network 1326 (e.g., an Ethernet connection, a digital subscriber line (DSL), a telephone line, coaxial cable, a cellular telephone system, etc.).

The processor platform 1300 also includes one or more mass storage devices 1328 for storing software and data. Examples of such mass storage devices 1328 include floppy disk drives, hard drive disks, compact disk drives and digital versatile disk (DVD) drives. The mass storage device 1328 may implement the example the product datastore 204, the store datastore 206, the question datastore 210, and/or the resulting datastore 220.

The coded instructions 1332 of FIGS. 3-5 may be stored in the mass storage device 1328, in the volatile memory 1314, in the non-volatile memory 1316, and/or on a removable storage medium such as a CD or DVD.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. A method comprising:
   receiving, at a collection entity, a first request from a first entity to audit a first product, the first request including a first instruction to determine information about a second product that competes with the first product;
   in response to the first request, assigning a first auditor to audit the first product and to record the information about the second product;
   receiving, at the collection entity, a second request from a second entity to audit a third product;
   determining that the second request includes a second instruction to determine information about the second product identified in the first request;
   in response to the second request and determining that the first instruction requests the information about the second product at a first level that is more granular than a second level requested by the second request, assigning a second auditor to audit the third product without including a further instruction to record the information about the second product to reduce an amount of memory utilized for storing the second auditor's responses to the instructions;
   receiving audit information about the second product at the first level from the first auditor; and
   computing the information about the second product at the second level from the audit information.

2. The method as defined in claim 1, wherein the first auditor is the same as the second auditor.

3. The method as defined in claim 1, further including:
   determining a number of data points to be collected in the audit of the first product; and
   adding the number of data points to a previous total of data points assigned to the first auditor to determine a current total, wherein assigning the second auditor to audit the third product is further in response to determining that the current total exceeds a threshold assigned to the first auditor.

4. The method as defined in claim 1, wherein the first request specifies collection of price and facing information for the first product and the second product.

5. The method as defined in claim 1, wherein the first request identifies multiple stores to be audited.

6. The method as defined in claim 5, further including storing an identification of one of the stores of the multiple stores in a datastore of the collection entity in response to determining that the one of the stores has not previously been stored in the datastore.

7. The method as defined in claim 1, further including:
   storing an identification of the first product in a datastore of the collection entity in response to determining that the first product has not previously been stored in a datastore at the collection entity; and
   removing the second instruction from memory to reduce the amount of used memory for storing instructions.

8. The method as defined in claim 1, further including storing audit information received from the first auditor in a datastore of the collection entity.

9. The method as defined in claim 8, further including storing an identification of a new store identified in the audit information in a store datastore of the collection entity in response to determining that the new store has not previously been stored in the store datastore.

10. The method as defined in claim 8, further including storing an identification of a new product identified in the audit information in a product datastore of the collection entity in response to determining that the new product has not previously been stored in the product datastore.

11. The method as defined in claim 1, wherein computing the information about the second product at the second level includes summing the information about the second product at the first level.

12. The method as defined in claim 1, wherein the first level is a stock-keeping unit level and the second level is a brand level.

13. The method as defined in claim 1, wherein the first level is a first time period and the second level is a second time period that is longer than the first time period.

14. An apparatus at a collection entity, the apparatus comprising:
   a job collection interface to receive a first request from a first entity to audit a first product, the first request including a first instruction to determine information about a second product that competes with the first product and to receive a second request from a second entity to audit a third product;
   a question analyzer to determine that the second request includes a second instruction to determine information about the second product identified in the first request, to combine the first instruction and the second instruction, to determine that the first instruction requests the information about the second product at a first level that is more granular than a second level requested by the second request, to receive audit information about the second product at the first level from a first auditor, and to compute the information about the second product at the second level from the audit information; and
   a workload balancer to, in response to the first request, assign the first auditor to audit the first product including recording the information about the second product and in response to the second request and the question analyzer determining that the first instruction requests the information about the second product at the first level that is more granular than the second level requested by the second request, assigning a second auditor to audit the third product without including a further instruction to record the information about the second product to reduce an amount of memory utilized for storing the second auditor's responses to the instructions, at least one of the job collection interface, the question analyzer, or the workload balancer including a tangible computer readable medium.

15. The apparatus as defined in claim 14, wherein question analyzer is to compute the information about the second product at the second level by summing the information about the second product at the first level.

16. The apparatus as defined in claim 14, wherein the first level is a stock-keeping unit level and the second level is a brand level.

17. The apparatus as defined in claim 14, wherein the first level is a first time period and the second level is a second time period that is longer than the first time period.

18. An tangible computer readable storage medium comprising instructions that, when executed, cause a machine to at least:
receive, at a collection entity, a first request from a first entity to audit a first product, the first request including a first instruction to determine information about a second product that competes with the first product;
in response to the first request, assign a first auditor to audit the first product and to record the information about the second product;
receive, at the collection entity, a second request from a second entity to audit a third product;
determine that the second request includes a second instruction to determine information about the second product identified in the first request;
in response to the second request and determining that the first instruction requests the information about the second product at a first level that is more granular than a second level requested by the second request, assign a second auditor to audit the third product without including a further instruction to record the information about the second product to reduce an amount of memory utilized for storing the second auditor's responses to the instructions;
receive audit information about the second product at the first level from the first auditor; and
compute the information about the second product at the second level from the audit information.

19. The tangible computer readable storage medium as defined in claim 18, wherein the instructions, when executed, cause the machine to compute the information about the second product at the second level by summing the information about the second product at the first level.

20. The tangible computer readable storage medium as defined in claim 18, wherein the first level is a stock-keeping unit level and the second level is a brand level.

21. The tangible computer readable storage medium as defined in claim 18, wherein the first level is a first time period and the second level is a second time period that is longer than the first time period.

22. The apparatus as defined in claim 14, wherein the first auditor is the same as the second auditor.

23. The apparatus as defined in claim 14, wherein the workload balancer is further to determine a number of data points to be collected in the audit of the first product and add the number of data points to a previous total of data points assigned to the first auditor to determine a current total, the workload balancer to assign the second auditor to audit the third product in response to determining that the current total exceeds a threshold assigned to the first auditor.

24. The apparatus as defined in claim 14, wherein the first request specifies collection of price and facing information for the first product and the second product.

25. The apparatus as defined in claim 14, wherein the first request identifies multiple stores to be audited.

26. The apparatus as defined in claim 25, further including a store datastore, wherein the job collection interface is further to store an identification of one of the stores of the multiple stores in the store datastore in response to determining that the one of the stores has not previously been stored in the store datastore.

27. The apparatus as defined in claim 14, further including a product datastore, wherein the job collection interface is further to store an identification of the first product in the product datastore in response to determining that the first product has not previously been stored in the product datastore at the collection entity.

28. The apparatus as defined in claim 14, further including an acquisition interface to receive audit information from the first auditor a data analyzer to store the audit information in a datastore of the collection entity.

29. The apparatus as defined in claim 28, further including a store datastore, wherein the data analyzer is further to store an identification of a new store identified in the audit information in the store datastore in response to determining that the new store has not previously been stored in the store datastore.

30. The apparatus as defined in claim 28, further including a product datastore, wherein the data analyzer is further to store an identification of a new product identified in the audit information in the product datastore in response to determining that the new product has not previously been stored in the product datastore.

31. The tangible computer readable storage medium as defined in claim 18, wherein the first auditor is the same as the second auditor.

32. The tangible computer readable storage medium as defined in claim 18, wherein the instructions, when executed, cause the machine to:
determine a number of data points to be collected in the audit of the first product; and
add the number of data points to a previous total of data points assigned to the first auditor to determine a current total, wherein assigning the second auditor to audit the third product is further in response to determining that the current total exceeds a threshold assigned to the first auditor.

33. The tangible computer readable storage medium as defined in claim 18, wherein the first request specifies collection of price and facing information for the first product and the second product.

34. The tangible computer readable storage medium as defined in claim 18, wherein the first request identifies multiple stores to be audited.

35. The tangible computer readable storage medium as defined in claim 34, wherein the instructions, when executed, cause the machine to store an identification of one of the stores of the multiple stores in a datastore of the collection entity in response to determining that the one of the stores has not previously been stored in the datastore.

36. The tangible computer readable storage medium as defined in claim 18, wherein the instructions, when executed, cause the machine to store an identification of the first product in a datastore of the collection entity in response to determining that the first product has not previously been stored in a datastore at the collection entity.

37. The tangible computer readable storage medium as defined in claim 18, wherein the instructions, when executed, cause the machine to store audit information received from the first auditor in a datastore of the collection entity.

38. The tangible computer readable storage medium as defined in claim 37, wherein the instructions, when executed, cause the machine to store an identification of a new store identified in the audit information in a store datastore of the collection entity in response to determining that the new store has not previously been stored in the store datastore.

39. The tangible computer readable storage medium as defined in claim 37, wherein the instructions, when executed, cause the machine to store an identification of a new product identified in the audit information in a product datastore of the collection entity in response to determining that the new product has not previously been stored in the product datastore.

* * * * *